US009685064B2

(12) United States Patent
Boyina et al.

(10) Patent No.: US 9,685,064 B2
(45) Date of Patent: Jun. 20, 2017

(54) AUTOMATED DETECTION OF AN EMERGENCY BY A USER DEVICE

(71) Applicant: Verizon Patent and Licensing Inc., Arlington, VA (US)

(72) Inventors: SriKamal Boyina, Visakhapatnam (IN); Rajasundaram Ganesan, Chennai (IN); Prabhu V. Mohan, Chennai, IN (US); Vijay A. Senthil, Chennai (IN); Vinodkrishnan Surianarayanan, Chennai (IN); Vijaykanth Veeraiyan, Thanjavur (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/927,839

(22) Filed: Oct. 30, 2015

(65) Prior Publication Data

US 2017/0124835 A1   May 4, 2017

(51) Int. Cl.
*G08B 29/00* (2006.01)
*G08B 21/04* (2006.01)
*H04W 4/22* (2009.01)
*H04M 1/725* (2006.01)
*H04W 4/02* (2009.01)

(52) U.S. Cl.
CPC .... *G08B 21/0415* (2013.01); *H04M 1/72538* (2013.01); *H04W 4/023* (2013.01); *H04W 4/22* (2013.01)

(58) Field of Classification Search
CPC .......... G08B 21/0415; H04M 1/72538; H04W 4/023; H04W 4/22
USPC ........................................................ 340/506
See application file for complete search history.

(56) References Cited

U.S. PATENT DOCUMENTS

| 5,311,197 | A   | * | 5/1994 | Sorden ................. | B60R 25/102 |
| | | | | | 342/357.31 |
| 6,678,612 | B1  | * | 1/2004 | Khawam ............... | G08B 25/016 |
| | | | | | 340/426.15 |
| 9,449,495 | B1  | * | 9/2016 | Call ....................... | G08B 25/10 |
| 2004/0153356 | A1 | * | 8/2004 | Lockwood ............. | G06Q 10/20 |
| | | | | | 705/305 |
| 2011/0096912 | A1 | * | 4/2011 | Stahlin ................. | G08B 25/002 |
| | | | | | 379/39 |
| 2015/0163832 | A1 | * | 6/2015 | Hosey ................. | H04W 76/007 |
| | | | | | 455/404.2 |
| 2015/0181172 | A1 | * | 6/2015 | Plante ................... | G06F 9/4443 |
| | | | | | 348/148 |

* cited by examiner

*Primary Examiner* — Jack K Wang

(57) ABSTRACT

A user device may determine that an environmental parameter, sensed by the user device, satisfies a condition, and may detect an emergency based on detecting that the environmental parameter satisfies the condition. The user device may output, via the user device, an alarm notification, and may determine whether an input is received by the user device to cancel the alarm notification. The user device may notify an emergency device when the user device determines that input is not received by the user device to cancel the alarm notification.

20 Claims, 4 Drawing Sheets

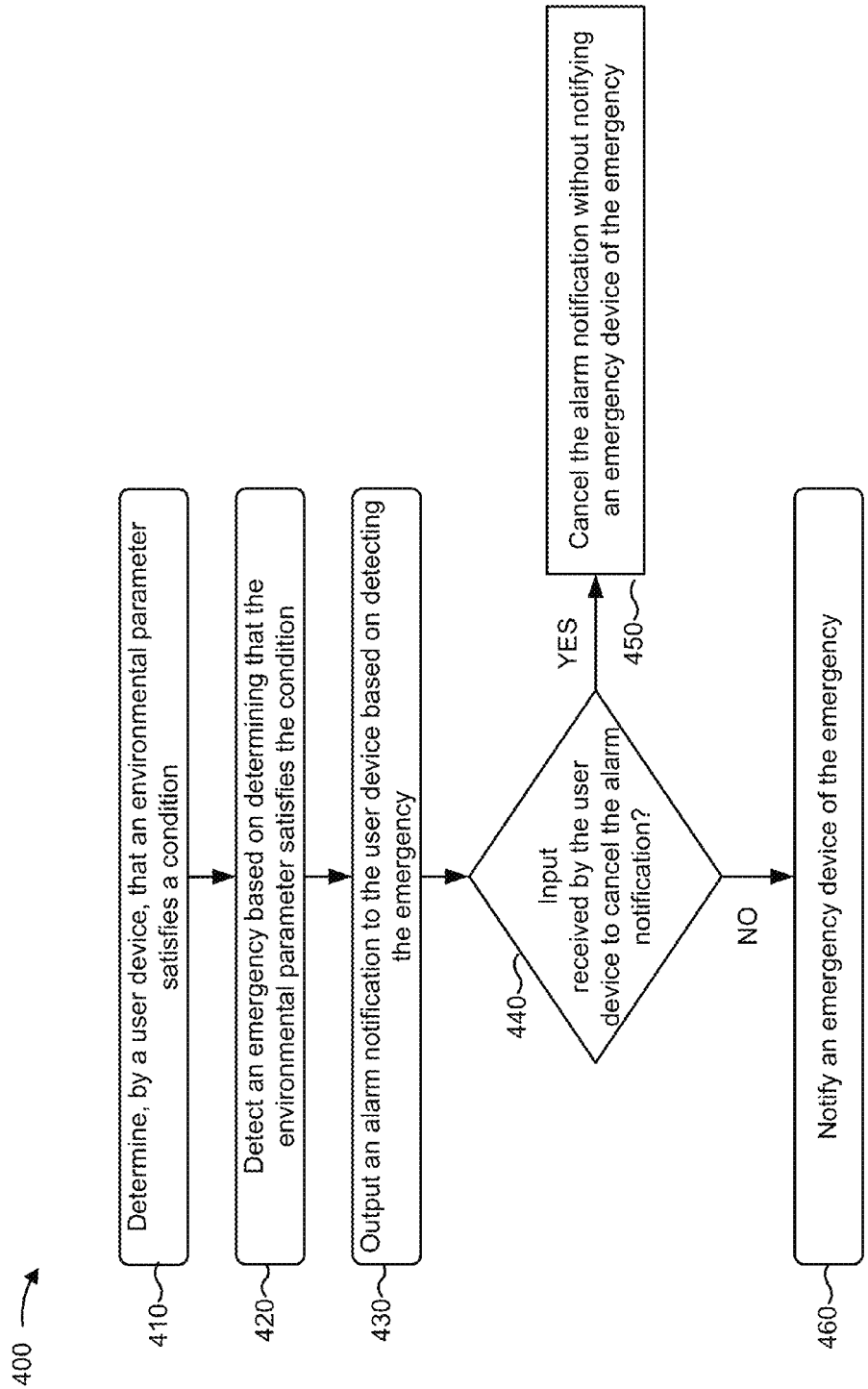

AUTOMATED DETECTION OF AN EMERGENCY BY A USER DEVICE

BACKGROUND

A mobile device, such as a smart phone, may include a variety of sensors, which may detect environmental changes and provide corresponding data to the mobile device. The mobile device may utilize sensor data to provide a particular output to a user of the mobile device.

BRIEF DESCRIPTION OF THE DRAWINGS

FIG. 4 is a flow chart of an example process for detecting an emergency and notifying an emergency device of the emergency.

DETAILED DESCRIPTION OF PREFERRED EMBODIMENTS

The following detailed description of example implementations refers to the accompanying drawings. The same reference numbers in different drawings may identify the same or similar elements.

A user of a user device, such as a smart phone, may often have the user device within close proximity throughout a majority of the day. The user may encounter an emergency situation that may result in the user becoming incapacitated (e.g., a car crash, a fire, a fall, etc.). Implementations described herein may utilize the user device to automatically detect an emergency, and to provide an automated notification to an emergency device based on detecting the emergency.

Figure 1:
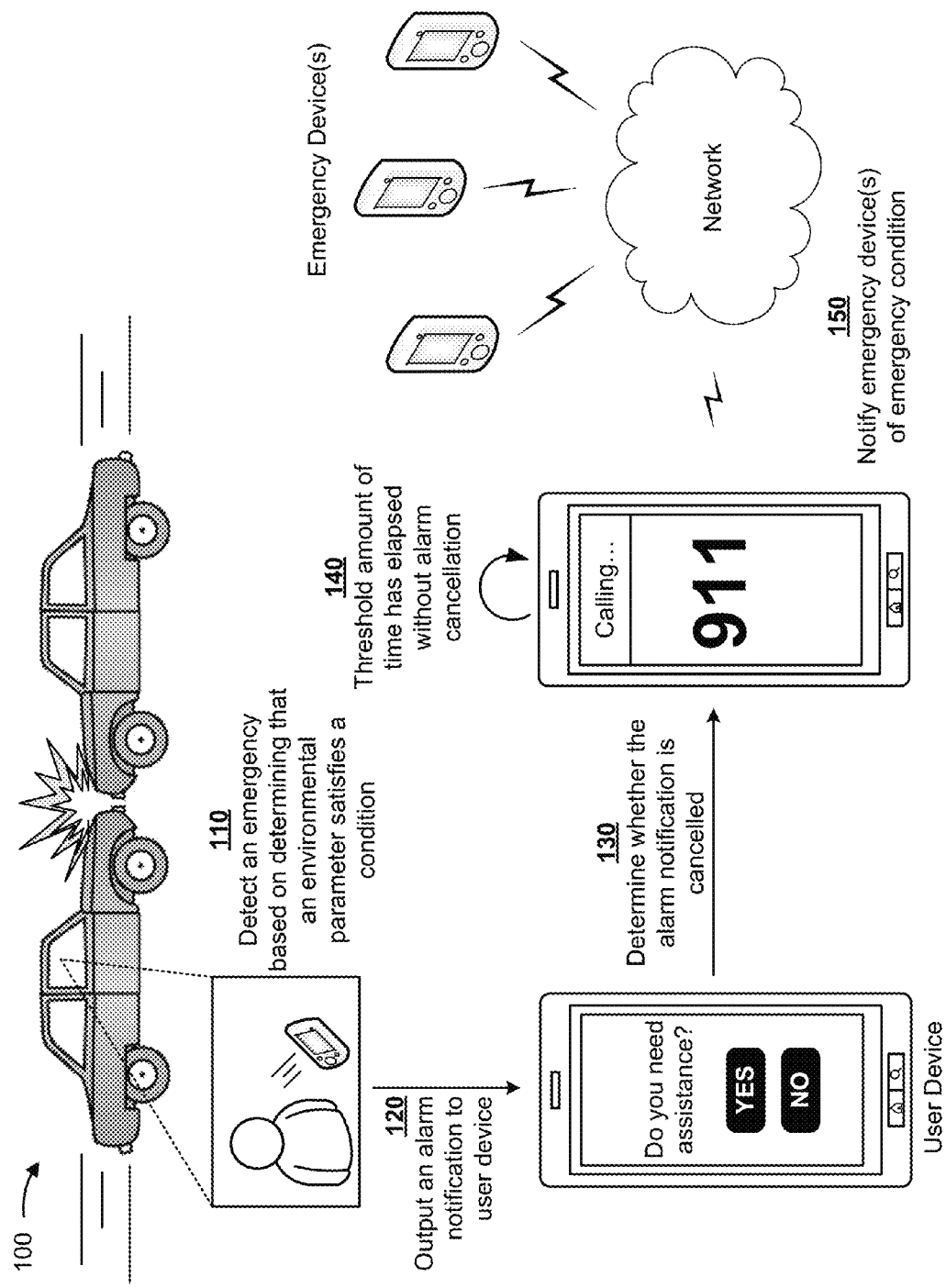
FIG. 1 is a diagram of an overview of an example implementation described herein.

FIG. 1 is a diagram of an overview of an example implementation 100 described herein. As shown in FIG. 1, example implementation 100 may include a user device, such as a smart phone. The user device may detect environmental parameters via one or more sensors.

As shown in FIG. 1, and by reference number 110, the user device may detect an emergency based on determining that an environmental parameter satisfies a condition. For example, the user device may detect one or more environmental parameters using one or more sensors of the user device (e.g., an accelerometer, a temperature sensor, etc.), and may determine that the environmental parameter satisfies a condition associated with an emergency (e.g., a car crash, a fire, etc.). In example implementation 100, assume that the user device uses an accelerometer to detect that a user of the user device was possibly involved in a car crash. As shown by reference number 120, the user device may output an alarm notification (e.g., via a display of the user device) based on detecting the emergency. As shown, the alarm notification may prompt the user regarding whether the user needs assistance with an emergency situation. In this way, the user device may enable the user to cancel the alarm notification if the user is not incapacitated and/or is not in need of assistance, thereby conserving user device resources and/or network resources.

As further shown in FIG. 1, and by reference number 130, the user device may determine whether the alarm notification is cancelled. For example, the user device may output the alarm notification to the user device for a threshold amount of time. As shown by reference number 140, the user device may determine that the threshold amount of time has elapsed without a cancellation of the alarm. For example, the user may be incapacitated and/or in need of assistance and, therefore, may be unable to cancel the alarm before the threshold amount of time elapses. As shown by reference number 150, the user device may notify one or more emergency devices of the emergency based on determining that the alarm has not been canceled. An emergency device may be associated with an emergency dispatcher, a contact stored by the user device, or another party.

Implementations described herein may allow a user device to detect an emergency and transmit an automated emergency notification to an emergency device based on detecting the emergency. In this way, the user device may notify one or more emergency devices in the event that a user is incapacitated due to the emergency. Further, the user device may permit the user to prevent transmission of the emergency notification when the user is not in an emergency, thereby conserving user device resources and/or network resources.

Figure 2:
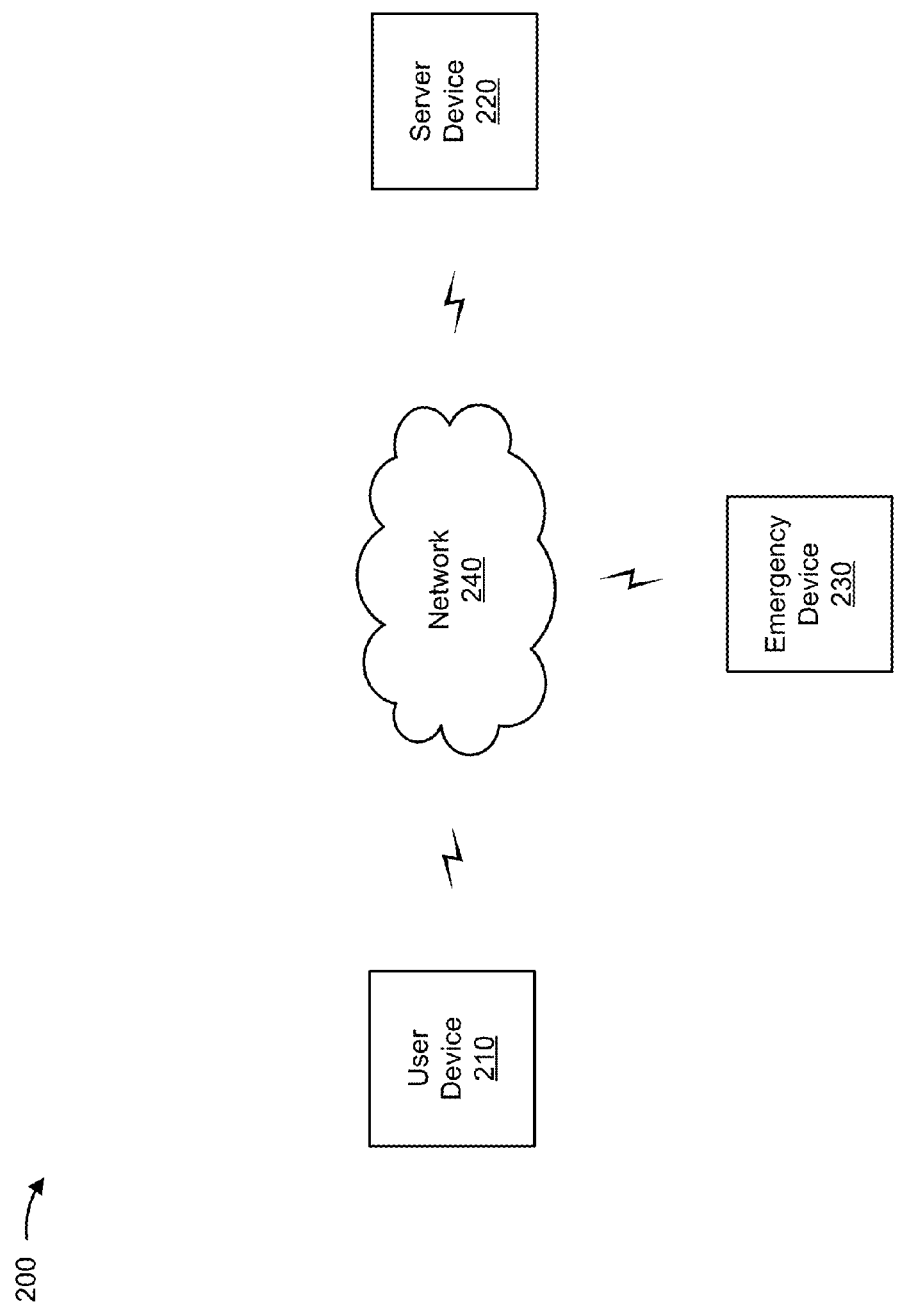
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, an emergency device 230, and a network 240. Devices of environment 200 may interconnect via wired connections, wireless connections, or a combination of wired and wireless connections.

User device 210 may include one or more devices capable of receiving, generating, storing, processing, and/or providing information associated with an emergency. For example, user device 210 may include a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device. In some implementations, user device 210 may include one or more sensors (e.g., an accelerometer, a gyrometer, a temperature sensor, a photodiode, a global positioning system (GPS), a camera, a microphone, a piezoelectric sensor, etc.) that permit user device 210 to receive input and/or detect environmental parameters associated with user device 210.

Server device 220 may include one or more devices, such as one or more server devices, capable of storing, processing, and/or routing information associated with an emergency. In some implementations, server device 220 may include a communication interface that allows server device 220 to receive information from and/or transmit information to other devices in environment 200.

Emergency device 230 may include one or more devices capable of receiving, generating, storing, processing, and/or providing information associated with an emergency. For example, emergency device 230 may include a mobile phone (e.g., a smart phone, a radiotelephone, etc.), a wireline phone (e.g., a land-line phone, a fixed-line phone, etc.), a laptop computer, a tablet computer, a terminal of an emergency operator (e.g., an emergency dispatcher), a device for receiving emergency calls (e.g., 911 calls), or a similar type of device. Emergency device 230 may communicate with user device 210 via network 240.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
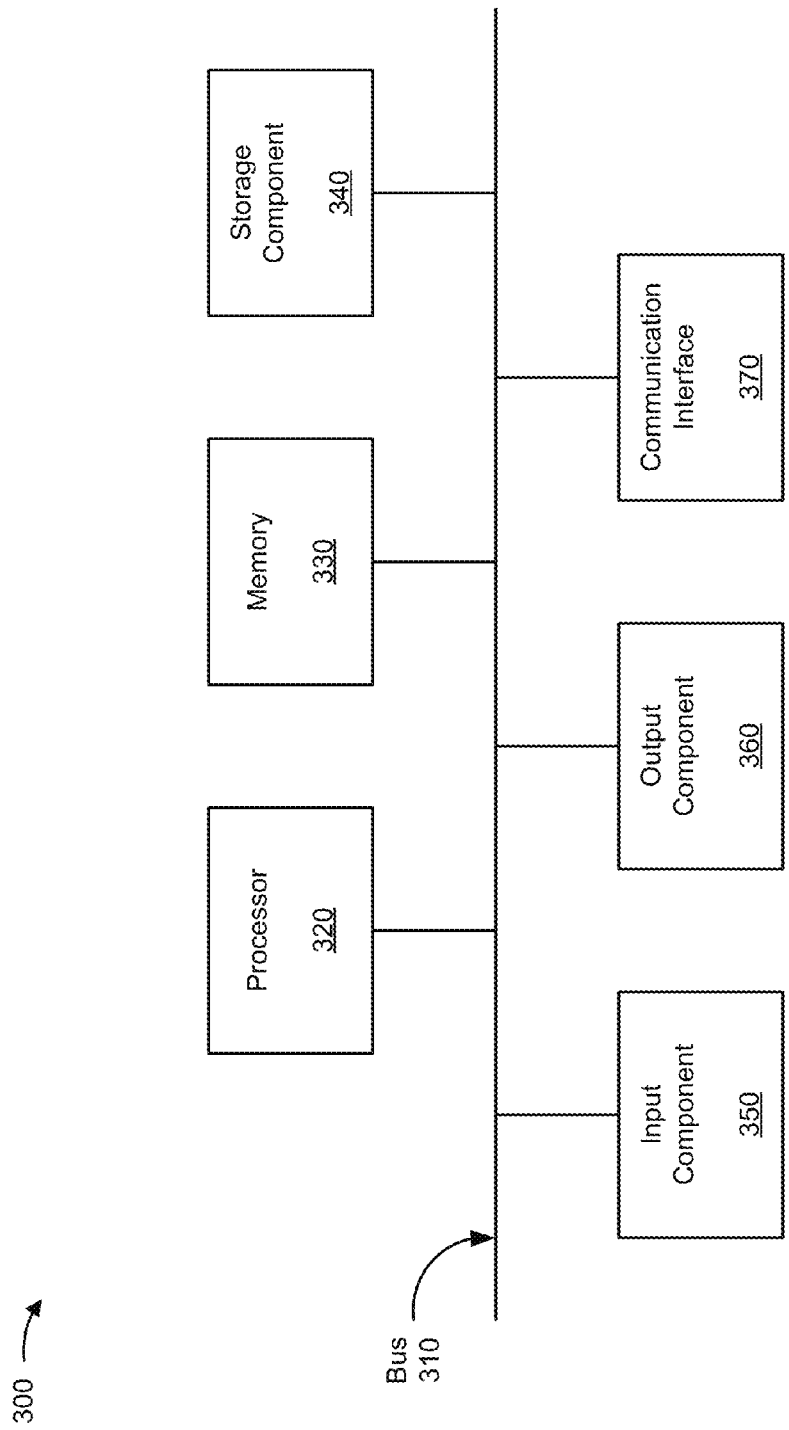
FIG. 3 is a diagram of example components of one or more devices of FIG. 2.

FIG. 3 is a diagram of example components of a device 300. Device 300 may correspond to user device 210, server device 220, and/or emergency device 230. In some implementations, user device 210, server device 220, and/or emergency device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a GPS component, an accelerometer, a gyrometer, an actuator, a temperature sensor, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a near-field communication (NFC) interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for detecting an emergency and notifying an emergency device of the emergency. In some implementations, one or more process blocks of FIG. 4 may be performed by user device 210. In some implementations, one or more process blocks of FIG. 4 may be performed by another device or a group of devices separate from or including user device 210, such as server device 220 and/or emergency device 230.

As shown in FIG. 4, process 400 may include determining, by a user device, that an environmental parameter satisfies a condition (block 410). For example, user device 210 may monitor an environmental parameter using one or more sensors of user device 210.

In some implementations, the environmental parameter may include a speed or velocity at which user device 210 is moving, an acceleration (e.g., a positive acceleration or a negative acceleration, or deceleration) of user device 210, an angular acceleration of user device 210, a geographic location of user device 210, a change in geographic location of user device 210, an altitude of user device 210, a force exerted on user device 210, an orientation of user device 210, a change in orientation of user device 210, or the like. By monitoring one or more of these environmental parameters, user device 210 may detect one or more types of emergencies, such as a vehicular crash, a traumatic event, the user being lost, the user being in a dangerous area, the user experiencing a fall, or the like.

In some implementations, the environmental parameter may include a temperature, a carbon monoxide level, an oxygen level, a chemical level, a smoke level, or a radiation level detected by user device 210. By monitoring one or more of these environmental parameters, user device 210 may detect one or more types of emergencies, such as a fire, a dangerous atmospheric condition, exposure to dangerous levels of a gas or radiation, or the like.

In some implementations, the environmental parameter may include a health metric of the user, such as a heart rate, a blood pressure, a body temperature, a chemical level (e.g., a blood glucose level, an insulin level, or the like.), an activity level, or the like. By monitoring one or more of these environmental parameters, user device 210 may detect one or more types of emergencies, such as a heart attack, an illness, the user being unconscious, or the like.

In some implementations, the environmental parameter may include a volume level detected by user device 210. For example, user device 210 may use a microphone to detect a volume level of noise within a vicinity of user device 210. By monitoring a volume level, user device 210 may detect one or more types of emergencies, such as gunfire, a vehicular crash, an explosion, or the like.

In some implementations, the environmental parameter may include a quantity of detected devices in a vicinity of user device 210. For example, user device 210 may detect other devices (or a lack of other devices) in the vicinity of user device 210 (e.g., by detecting a near-field communication (NFC), available and/or connected radio communications, such as a WiFi or Bluetooth connection, etc.). In some implementations, the environmental parameter may include a network connectivity of user device 210, such as whether user device 210 is connected to a particular type of network. Additionally, or alternatively, the environmental parameter may relate to the available networks that user device 210 may access. By monitoring one or more of these environmental parameters, user device 210 may detect one or more types of emergencies, such as the user being lost, the user deviating from a certain area, or the like.

In some implementations, the environmental parameter may include a number of detected faces in a vicinity of user device 210. For example, user device 210 may detect the face of a user of user device 210 and/or other faces in the vicinity of user device 210. By monitoring a face of the user, user device 210 may detect one or more types of emergencies, such as whether the user is unconscious.

The environmental parameters described above are merely examples of environmental parameters that may be determined by user device 210. In some implementations, user device 210 may determine that one or more environmental parameters satisfy one or more conditions, as described in more detail below.

As further shown in FIG. 4, process 400 may include detecting an emergency based on determining that the environmental parameter satisfies the condition (block 420). For example, user device 210 may monitor an environmental parameter and may determine that the environmental parameter satisfies a condition. Further, user device 210 may detect an emergency based on determining that the environmental parameter satisfies the condition. For example, user device 210 may store information associated with emergency detection (e.g., information that indicates that if an environmental parameter satisfies a condition, then an emergency exists). In some implementations, user device 210 may be configured with the information associated with emergency detection. Additionally, or alternatively, user device 210 may receive the information associated with emergency detection from another device, such as server device 220. In some implementations, a user of user device 210 may input the information associated with emergency detection.

In some implementations, user device 210 may detect the emergency based on determining that one or more environmental parameters satisfy one or more conditions (e.g., an acceleration value satisfying a threshold, etc.). For example, in some implementations, user device 210 may determine that an emergency exists when a single environmental parameter satisfies a condition. In some implementations, user device 210 may determine that an emergency exists when multiple environmental parameters satisfy one or more conditions. In some implementations, user device 210 may detect the emergency based on determining that a change in an environmental parameter satisfies a condition. In some implementations, user device 210 may detect the emergency based on determining that a change in an environmental parameter, which occurs within a threshold amount of time, satisfies a condition.

In some implementations, user device 210 may detect the emergency based on determining that an environmental parameter satisfies a first condition at a first time, and that the environmental parameter satisfies a second condition at a second time. For example, user device 210 may determine that an environmental parameter (e.g., a measured velocity value) satisfies a condition (e.g., a velocity threshold value) at a first time, and that the environmental parameter (e.g., a measured velocity value) satisfies a second condition (e.g., a velocity threshold value) at a second time.

In some implementations, user device 210 may detect the emergency based on determining that a first environmental parameter satisfies a first condition at a first time, and that a second environmental parameter satisfies a second condition at a second time. For example, user device 210 may determine that a first environmental parameter (e.g., a measured acceleration value) satisfies a first condition (e.g., an acceleration threshold value) at a first time, and that a second environmental parameter (e.g., a measured velocity value) satisfies a second condition (e.g., a velocity threshold value) at a second time.

In some implementations, user device 210 may detect the emergency based on determining that a first environmental parameter satisfies a first condition and that a second environmental parameter does not satisfy a second condition. For example, user device 210 may determine that a first environmental parameter (e.g., a measured heart rate) satisfies a condition (e.g., a heart rate threshold value), and that a second environmental parameter (e.g., a measured velocity value) does not satisfy a second condition (e.g., a velocity threshold value). In some implementations, user device 210 may detect an emergency based on determining that an environmental parameter matches a condition (e.g., a geographic location of user device 210 matching a particular location).

In some implementations, a user may configure one or more conditions. For example, a user may adjust a sensitivity of user device 210 for detecting an emergency. For example, the user may plan to engage in an activity where the user may be susceptible to emergency situations. Prior to performing the activity, the user may adjust one or more conditions such that the threshold for detecting an emergency is reduced, as compared to an original threshold. In some implementations, user device 210 may adjust a threshold for detecting an emergency based on an environmental parameter, such as a time and/or date, a geographic location, or the like.

As further shown in FIG. 4, process 400 may include outputting an alarm notification to the user device based on detecting the emergency (block 430). For example, user device 210 may output an alarm notification that may indicate that the user device 210 detected an emergency, and that user device 210 may notify emergency device 230 of the emergency. The alarm notification may allow the user of user device 210 to cancel an automated emergency notification. In this way, the user of user device 210 may cancel an automated emergency notification if, for example, user device 210 determined a false positive (e.g., associated a drop of user device 210 with an emergency, or the like).

In some implementations, the alarm notification may provide a prompt for the user to input a response to cancel the alarm. For example, the prompt may be a message displayed via a user interface of user device 210. Additionally, or alternatively, the prompt may be an SMS message, a telephone call, an audible alarm, a visual alarm, or the like. In some implementations, the prompt may be transmitted to user device 210 and/or another user device 210.

In some implementations, user device 210 may output the alarm notification for a threshold amount of time. For example, user device 210 may delay transmitting an automated emergency notification until a threshold amount of time has elapsed after outputting the alarm notification. In some implementations, user device 210 may determine the threshold amount of time based on the detected emergency. For example, user device 210 may output the alarm notification for a shorter period of time during more urgent emergencies (e.g., during a fire), than during less urgent emergencies (e.g., a blood glucose level deficiency). In some implementations, user device 210 may associate the severity of the detected emergency with the threshold amount of time (e.g., may determine the degree to which the environmental parameter differs from a threshold value). For example, user device 210 may output the alarm notification for a shorter period of time based on detecting a severe value associated with the emergency (e.g., an acceleration exceeding a threshold by a particular degree), than as compared to detecting a less severe value associated with the emergency (e.g., an acceleration exceeding the threshold by a lesser degree).

In some implementations, user device 210 may store information associated with an alarm notification duration (e.g., information associating a detected emergency with a threshold amount of time, an emergency with an urgency level, an urgency level with a threshold amount of time, etc.) Additionally, or alternatively, user device 210 may be configured with the information associated with the alarm notification duration. Additionally, or alternatively, user device 210 may receive the information associated with the alarm notification duration from another device, such as server device 220.

As further shown in FIG. 4, process 400 may include determining whether input is received by the user device to cancel the alarm notification (block 440). For example, user device 210 may determine whether an input is received to cancel the alarm notification. In some implementations, user device 210 may determine whether an input is received to cancel the alarm notification within a threshold amount of time.

In some implementations, user device 210 may detect a user input to cancel the alarm notification. For example, a user may input a corresponding response to the prompt (e.g., interact with a user interface of user device 210, input a response to an SMS message, answer a telephone call, provide a verbal command, etc.).

In some implementations, user device 210 may determine an input to cancel the alarm based on monitoring one or more environmental parameters. For example, user device 210 may monitor the environmental parameter that satisfied the condition (e.g., may monitor a temperature after detecting a fire). In some implementations, user device 210 may monitor a parameter that did not satisfy the condition (e.g., may monitor a velocity after detecting a vehicular crash). For example, user device 210 may determine that the user device 210 is moving, thereby indicating that the emergency may not have occurred. In some implementations, user device 210 may determine that the environmental parameter no longer satisfies the condition. For example, the environmental parameter (e.g., a temperature) may no longer satisfy the condition after the emergency (e.g., a fire) was detected. In this way, user device 210 may determine that the emergency is no longer occurring, and/or that the emergency may have never occurred (e.g., user device 210 determined a false positive). For example, an environmental parameter may satisfy a condition at a first time (e.g., triggering the alarm notification), and no longer satisfy the condition at a second time (e.g., cancelling the alarm notification).

In some implementations, the alarm notification may provide a prompt for the user to input a response to transmit the emergency notification. For example, user device 210 may output the alarm notification, and may transmit the alarm notification based on receiving an input to the prompt. In this way, an input to the prompt would result in a transmission of the emergency notification, and no input to the prompt would result in a cancellation of the transmission of the emergency notification.

As further shown in FIG. 4, if input is received by the user device to cancel the alarm notification (block 440—YES), then process 400 may include cancelling the alarm notification without notifying an emergency device of the emergency (block 450). For example, user device 210 may cancel the alarm notification without notifying emergency device 230 (e.g., without transmitting the automated emergency notification) of the emergency based on detecting an input within a threshold amount of time. In some implementations, user device 210 may cancel the alarm based on a user input. For example, a user of user device 210 may input a response to the alarm notification. Additionally, or alternatively, a user may cancel the alarm notification by moving user device 210 (e.g., in a particular manner, etc.). In some implementations, a user may cancel the alarm by providing an audible response (e.g., by giving a verbal command, or the like).

In some implementations, user device 210 may cancel the alarm notification based on detecting the user of user device 210. For example, user device 210 may detect the user's face (e.g., by using a front-facing camera), the user's voice (e.g., by using a microphone), and/or the user's fingerprint (e.g., by using a fingerprint reader). In some implementations, user device 210 may cancel the alarm notification based on detecting a different person in proximity to user device 210. In some implementations, user device 210 may cancel the alarm notification based on monitoring one or more parameter values and/or determining that a parameter value no longer satisfies a condition.

As further shown in FIG. 4, if input is not received by the user device to cancel the alarm notification (block 440—NO), then process 400 may include notifying an emergency device of the emergency (block 460). For example, user device 210 may notify emergency device 230 of the emergency based on not receiving an input to cancel the alarm notification. In some implementations, user device 210 may notify emergency device 230 based on not receiving an input to cancel the alarm notification within a threshold amount of time. User device 210 may notify one or more emergency devices 230 based on detecting the emergency and not receiving input to cancel the alarm notification. Emergency device 230 may be associated with a safety and/or rescue department (e.g., police department, fire department, highway patrol, etc.).

In some implementations, emergency device 230 may be another user device 210. For example, a user may input a preference to notify a particular contact based on the detected emergency (e.g., 911 in case of a heart attack, a relative in the event of a fall, etc.). In some implementations, user device 210 may notify a contact having a same surname as the user, a contact that the user has contacted most recently, a contact that the user has contacted most frequently, a contact that the user has had the greatest number of interactions with (e.g., texts, calls, etc.), a contact with a particular designation (e.g., "In Case of Emergency"), a contact that is closest in proximity to the user, a contact that the user designated based on the emergency, etc.

In some implementations, user device 210 may determine an emergency device 230 to contact based on the detected emergency. For example, user device 210 may notify an emergency device 230 associated with the emergency (e.g., notify the fire department based on detecting a fire, etc.). In some implementations, user device 210 may determine a geographic location of user device 210, and may notify emergency device 230 in proximity to user device 210. In some implementations, user device 210 may provide emergency device 230 with a geographic location of user device 210.

In some implementations, user device 210 may determine an emergency device 230 and/or another user device 210 to contact based on the sensor(s) that detected the emergency. For example, if a temperature sensor detected the emergency (e.g., a fire), then user device 210 may notify an emergency device 230 associated with a fire department. As another example, if an accelerometer, gyrometer, and/or a piezoelectric sensor detected the emergency (e.g., a vehicular crash), then user device 210 may notify an emergency device 230 associated with a police department. In some implementations, a user may input a preference to notify a particular contact based on the sensor that detects an emergency. For example, a user may input a preference that a particular contact (e.g., a relative, a local hospital, etc.) be contacted based on a heart rate sensor detecting an emergency (e.g., a heart attack).

In some implementations, user device 210 may notify emergency device 230 by calling emergency device 230. Additionally, or alternatively, user device 210 may transmit an SMS message, or another text-based message, to emergency device 230. In some implementations, user device 210 may transmit a first type of notification to a first emergency device 230, and may transmit a second type of notification to a second emergency device 230. For example, user device 210 may call a first emergency device 230, transmit an SMS message to the first emergency device 230, and transmit an SMS message to a second emergency device 230.

In some implementations, user device 210 may provide information to emergency device 230, such as the environmental parameter, the condition that was satisfied, a geographic location of the user, a health metric of the user, or the like. In some implementations, server device 220 may provide the information to emergency device 230. In this way, a user of emergency device 230 may provide assistance to a user of user device 210 in the event that the user of user device 210 is incapacitated as a result of the emergency.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable a user device to detect an emergency condition and transmit an automated emergency notification to an emergency device. In this way, the user device may notify emergency devices in the event that a user is incapacitated based on the emergency. A user of an emergency device may provide assistance to the user of the user device in the event of an emergency. Further, implementations described herein may allow a user to cancel an automated emergency notification in the event that the user is not in need of assistance, thereby conserving user device resources and network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
one or more processors to:
determine that an environmental parameter, sensed by the user device, satisfies a condition,
the environmental parameter including a health metric of a user of the user device,
the health metric being sensed by the user device;
detect an emergency based on determining that the environmental parameter satisfies the condition;
output, via the user device, an alarm notification based on detecting the emergency;
determine whether an input is received by the user device to cancel the alarm notification; and
selectively notify another device, different from the user device, of the emergency based on determining whether the input is received by the user device,
the user device notifying the other device of the emergency and transmitting the health metric to the other device when the user device determines that the input is not received by the user device to cancel the alarm notification, and
the user device not notifying the other device of the emergency when the user device determines that the input is received to cancel the alarm notification.

2. The user device of claim 1, where the one or more processors, when outputting the alarm notification, are to:
output the alarm notification for a threshold amount of time, and
where the one or more processors, when determining whether the input is received to cancel the alarm notification, are to:
determine whether the input is received within the threshold amount of time.

3. The user device of claim 1, where the environmental parameter represents an acceleration or a velocity of the user device.

4. The user device of claim 1, where the one or more processors, when determining whether the input is received to cancel the alarm notification, are to:
detect a user interaction with the user device; and
where the one or more processors, when selectively notifying the other device of the emergency, are to:
prevent the user device from notifying the other device of the emergency based on detecting the user interaction with the user device.

5. The user device of claim 1, where the one or more processors are further to:
determine a geographic location of the user device; and
where the one or more processors, when selectively notifying the other device of the emergency, are to:
identify the other device based on a proximity of the other device to the geographic location of the user device.

6. The user device of claim 1, where the one or more processors, when selectively notifying the other device of the emergency, are to:
select the other device based on a type of the emergency.

7. The user device of claim 1, where the health metric is at least one of:
heart rate,
blood pressure,
body temperature,
a chemical level, or
an activity level.

8. A non-transitory computer-readable medium storing instructions, the instructions comprising:
one or more instructions that, when executed by one or more processors of a user device, cause the one or more processors to:
determine that an environmental parameter, detected by a sensor of the user device, satisfies a condition,
the environmental parameter including a health metric of a user of the user device,
the health metric being sensed by the user device;
detect an emergency based on determining that the environmental parameter satisfies the condition;
output an alarm notification via the user device based on detecting the emergency;
determine whether an input is received by the user device to cancel the alarm notification; and
selectively notify another device, different from the user device, of the emergency based on determining whether the input is received by the user device,
the user device notifying the other device of the emergency and transmitting the health metric to the other device when the user device determines that the input is not received by the user device to cancel the alarm notification, and
the user device not notifying the other device of the emergency when the user device determines that the input is received to cancel the alarm notification.

9. The non-transitory computer-readable medium of claim 8, where the one or more instructions, that cause the one or more processors to output the alarm notification, cause the one or more processors to:
output the alarm notification for a threshold amount of time; and where the one or more instructions, that cause the one or more processors to determine whether the input is received, cause the one or more processors to:
determine whether the input is received within the threshold amount of time.

10. The non-transitory computer-readable medium of claim 8, where the one or more instructions, that cause the one or more processors to determine that the environmental parameter satisfies the condition, cause the one or more processors to:
measure a temperature using the sensor; and
determine that the temperature satisfies a threshold.

11. The non-transitory computer-readable medium of claim 8, where the one or more instructions, that cause the one or more processors to determine whether the input is received, cause the one or more processors to:
detect a movement of the user device; and
where the one or more instructions, that cause the one or more processors to selectively notify the other device of the emergency, cause the one or more processors to:
prevent the user device from notifying the other device based on detecting the movement of the user device.

12. The non-transitory computer-readable medium of claim 8, where the one or more instructions, that cause the one or more processors to determine whether the input is received, cause the one or more processors to:
detect a voice of the user of the user device; and
where the one or more instructions, that cause the one or more processors to selectively notify the other device of the emergency, cause the one or more processors to:
prevent the user device from notifying the other device based on detecting the voice of the user.

13. The non-transitory computer-readable medium of claim 8, where the one or more instructions, that cause the one or more processors to determine whether the input is received, cause the one or more processors to:
detect a voice of the user of the user device; and
where the one or more instructions, that cause the one or more processors to selectively notify the other device of the emergency, cause the one or more processors to:
notify the other device of the emergency based on detecting the voice of the user.

14. The non-transitory computer-readable medium of claim 8, where the one or more instructions, that cause the one or more processors to determine that the environmental parameter satisfies the condition, cause the one or more processors to:
determine that the environmental parameter no longer satisfies the condition; and
where the one or more instructions, that cause the one or more processors to selectively notify the other device of the emergency, cause the one or more processors to:
prevent the user device from notifying the other device based on determining that the environmental parameter no longer satisfies the condition.

15. A method, comprising:
determining, using a sensor of a first device, that an environmental parameter satisfies a condition,
the environmental parameter including a health metric of a user of the first device,
the health metric being sensed by the first device;
detecting, by the first device, an emergency based on determining that the environmental parameter satisfies the condition;
outputting, by the first device, an alarm notification based on detecting the emergency;
determining, by the first device, whether an input is received to cancel the alarm notification; and
selectively notifying, by the first device, a second device, different from the first device, of the emergency based on determining whether the input is received by the first device,
the first device notifying the second device of the emergency and transmitting the health metric to the second device when the first device determines that the input is not received by the first device to cancel the alarm notification, and
the first device not notifying the second device of the emergency when the first device determines that the input is received to cancel the alarm notification.

16. The method of claim 15, where the environmental parameter represents an acceleration or velocity of the first device, and the condition indicates that the acceleration or the velocity satisfies a threshold.

17. The method of claim 15, where a telephone number of the second device is stored by the first device and used by the first device to provide the notification of the emergency.

18. The method of claim 15, where the alarm notification includes information provided via a user interface of the first device.

19. The method of claim 15, where notifying the second device of the emergency comprises:
notifying the second device of a geographic location of the first device.

20. The method of claim 15, where the health metric is at least one of:
heart rate,
blood pressure,
body temperature,
a chemical level, or
an activity level.

* * * * *